(12) United States Patent
Gottlieb et al.

(10) Patent No.: US 10,852,173 B2
(45) Date of Patent: Dec. 1, 2020

(54) FLOWMETERS AND METHODS OF MANUFACTURE

(71) Applicant: Sensia LLC, Houston, TX (US)

(72) Inventors: Emanuel J. Gottlieb, Upper Saint Clair, PA (US); Gopalakrishna S. Magadi, The Woodlands, TX (US)

(73) Assignee: Sensia LLC, Houston, TX (US)

( * ) Notice: Subject to any disclaimer, the term of this patent is extended or adjusted under 35 U.S.C. 154(b) by 0 days.

(21) Appl. No.: 16/224,380

(22) Filed: Dec. 18, 2018

(65) Prior Publication Data

US 2020/0191633 A1 Jun. 18, 2020

(51) Int. Cl.
*G01F 15/14* (2006.01)
*G01F 1/10* (2006.01)
*G01F 15/18* (2006.01)

(52) U.S. Cl.
CPC ............ *G01F 15/14* (2013.01); *G01F 1/10* (2013.01); *G01F 15/185* (2013.01)

(58) Field of Classification Search
CPC ............ G01F 15/14; G01F 1/10; G01F 15/18
See application file for complete search history.

(56) References Cited

U.S. PATENT DOCUMENTS

| | | |
|---|---|---|
| 3,792,611 A | 2/1974 | Kozak et al. |
| 8,210,211 B2 | 7/2012 | McMasters et al. |
| 9,109,931 B2 * | 8/2015 | Bardon ............... G01F 1/12 |
| 9,453,749 B1 * | 9/2016 | Bachmann ............ G01F 1/667 |
| 9,689,727 B2 * | 6/2017 | Kissling .............. G01F 1/662 |
| 9,778,081 B2 | 10/2017 | Neilson et al. |
| 2015/0204704 A1 * | 7/2015 | Wiest ................. G01F 1/667 73/861.28 |
| 2017/0074698 A1 * | 3/2017 | Teufel ................ G01F 1/667 |
| 2017/0102089 A1 | 4/2017 | Griffin et al. |
| 2017/0138772 A1 | 5/2017 | Neilson et al. |
| 2017/0328152 A1 * | 11/2017 | Jaffrey ............... G01F 1/662 |
| 2018/0087938 A1 | 3/2018 | Neilson et al. |

FOREIGN PATENT DOCUMENTS

| ES | 2065861 B1 | 2/1995 |
|---|---|---|
| WO | 2013187936 A1 | 12/2013 |

OTHER PUBLICATIONS

International Search Report and Written Opinion issued in PCT/US2019/066952 dated Apr. 1, 2020.

* cited by examiner

*Primary Examiner* — Jewel V Dowtin
(74) *Attorney, Agent, or Firm* — Foley & Lardner LLP (57) ABSTRACT

A flowmeter system that includes a flowmeter body defining a central bore. A plurality of flanges couple to the flowmeter body. The flowmeter body and the plurality of flanges form a one-piece structure without welded joints. A rotor within the central bore of the flowmeter body. A first vane within the central bore of the flowmeter body. The first vane couples to and supports the rotor within the flowmeter body. The flowmeter body, the flanges, the rotor, and the first vane comprise additive structures.

20 Claims, 9 Drawing Sheets

FLOWMETERS AND METHODS OF MANUFACTURE

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Flowmeters measure flow rates of fluid. For example, mineral extraction systems or pipeline systems carry fluids, and a flowmeter may be used to measure a flow rate of the fluid through them. The configuration of the flowmeter can impact the ability of the flowmeter to accurately measure the flow rate of the fluid, and can also impact durability of the flowmeter and installation processes for the flowmeter. Therefore, it would be desirable to improve the configuration of flowmeters.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain systems, such as mineral extraction systems (e.g., drilling and production systems) or pipeline systems, may include various fluid-handling components (e.g., conduits, tanks, injectors). For example, a conduit may direct a flow of a fluid (e.g., water, chemicals, gas, liquid, production fluid, drilling fluid) from one location to another location. A flowmeter may be provided to monitor a flow rate of the fluid through the conduit.

Flowmeter systems may include a flowmeter body that is formed by machining a solid structure (e.g., metal block) into a generally cylindrical conduit having a central bore, which is aligned with adjacent conduits to enable the flow of fluid across the flowmeter. Some flowmeters may include a connector (e.g., annular connector) that extends radially from the flowmeter body and that is configured to support a measurement device (e.g., transmitter or a flow sensor). The connector may be machined separately and then welded to a sidewall of the flowmeter body. Furthermore, some flowmeters may include flanges at ends of the flowmeter body to facilitate coupling of the flowmeter to adjacent conduits. The flanges may also be machined separately and then welded to the flowmeter body.

In some cases, it may be desirable to form the flowmeter, the connector, and/or the flanges from high strength materials, such as a nickel-based alloy (e.g., Inconel 718) or a stainless steel material (e.g., martensitic precipitation hardened stainless steel, such as 17-4 PH). However, such materials may be difficult to properly or efficiently weld without local failures (e.g., cracking). Accordingly, the manufacturing process may be lengthy and complex, and the flowmeters produced via welding processes may be frequently identified as noncompliant with regulatory standards during testing and final inspections. Furthermore, the use of additional connectors to support multiple sensors (e.g., ultrasonic sensors or other flow sensors) may be inappropriate due to limited space about the flowmeter body to support additional separate welded joints, as well as due to the increased risk of local failures and noncompliant flowmeters from the additional welded joints. Furthermore, the flowmeter may be a solid, heavy component, which in turn, may make transport, installation, and maintenance of the flowmeter challenging.

Accordingly, certain disclosed embodiments relate to flowmeters having a flowmeter body assembly with a flowmeter body, a connector configured to support a measurement device (e.g., transmitter having an electronic controller) to facilitate accurate measurement of the flow rate of the fluid. Some or all of the flowmeter body, the connector, a rotor, and vanes may be formed as a one-piece structure without welded joints with an additive structure (e.g., open cell structure, non-solid structure, non-continuous structure, or framework). For example, the additive structure may include through holes that extend between opposed axially-facing surfaces of a flange. The additive structure may reduce the weight of the flowmeter (e.g., as compared to flowmeters having solid flanges manufactured via traditional techniques), thereby facilitating transport, installation, and/or maintenance of the flowmeter. For example, in some embodiments, a flange having an additive structure may weigh at least 10, 20, 30, 40, or 50 percent less than the flange without the additive structure (e.g., solid flange).

In certain embodiments, the flowmeter system may be manufactured via additive manufacturing techniques. Such techniques may enable construction of the flowmeter system from computer models, without difficult machining steps. In general, additive manufacturing techniques involve applying a source of energy, such as a laser or electron beam, to deposited feedstock (e.g., powder or wire) in order to grow a part having a particular shape and features. The flowmeter disclosed herein may be utilized as part of any suitable fluid-handling system, such as an energy-acquisition or processing system (e.g., a hydrocarbon-production or processing system, such as a subsea or surface oil or gas well, a pipeline, a natural-gas processing terminal, a refinery, or a natural-gas powered electrical plant).

Figure 1:
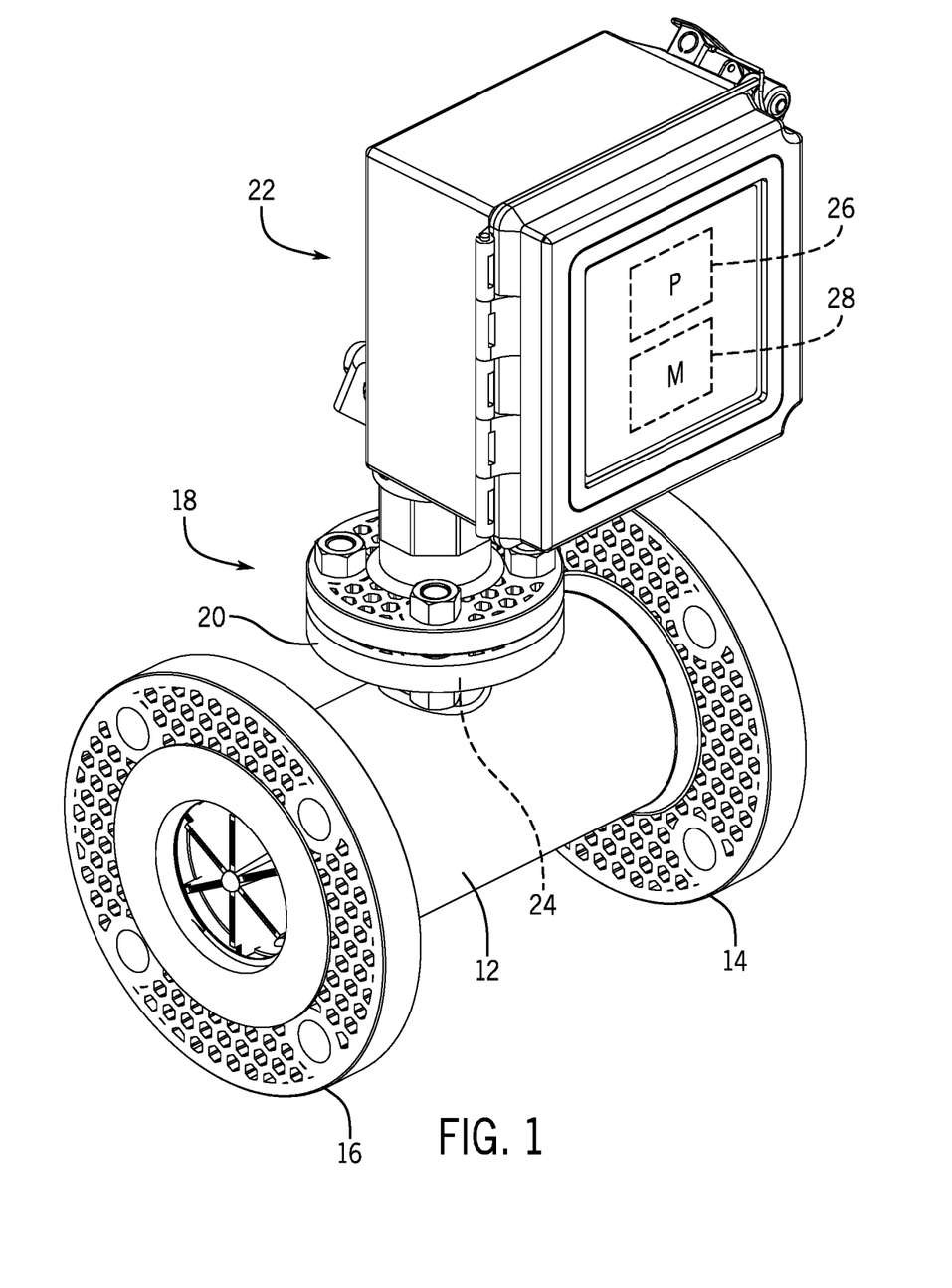
FIG. 1 is a perspective view of a flowmeter system, in accordance with an embodiment of the present disclosure.

Turning now to the figures, FIG. 1 is a perspective view of a flowmeter system 10. The flowmeter system 10 includes a flowmeter body 12 (e.g., main or primary annular conduit), a flange 14 (e.g., annular flange), a downstream flange 16 (e.g., annular flange), and a connector 18 (e.g., radial connector). The flowmeter system 10 may also include additional connectors (e.g., radial connectors). In some embodiments, the connector 18 may include a flange 20. The connector 18 may be configured to support a controller 22 that couples to a sensor 24. The controller 22 may include a processor 26 that communicates with a memory 28.

As will be discussed in more detail below, some or all of the components of the flowmeter system 10 may be formed via an additive manufacturing process. Thus, the components of the flowmeter system 10 may be formed together as a one-piece structure (e.g., a gaplessly continuous one-piece structure) that is devoid of welded joints.

Figure 2:
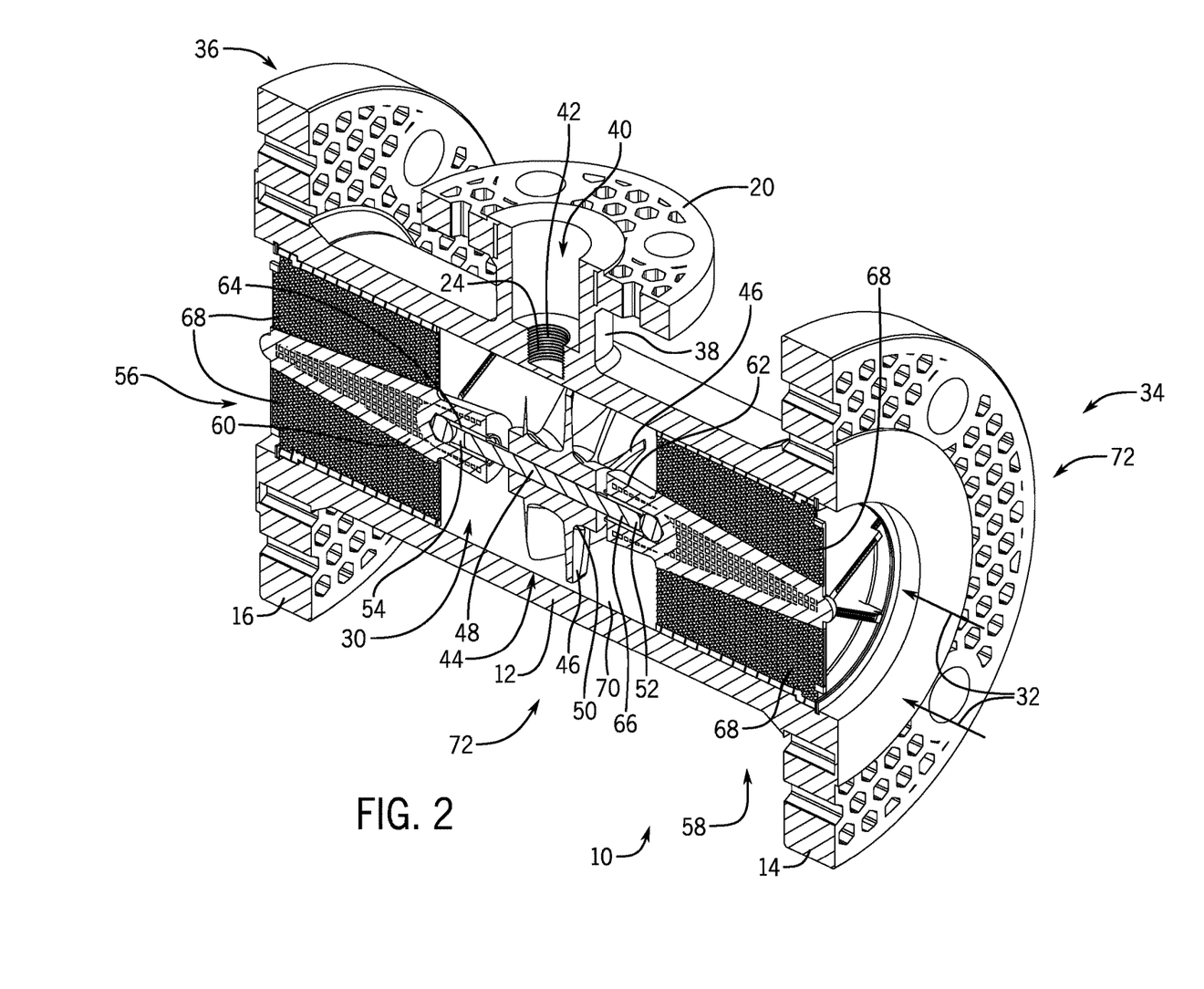
FIG. 2 is a perspective cross-sectional view of a flowmeter system of FIG. 1, in accordance with an embodiment of the present disclosure.

FIG. 2 is a perspective cross-sectional view of a flowmeter system 10 of FIG. 1. As shown, the flowmeter body 12 defines a bore 30 (e.g., central bore), which may be aligned with respective bores of adjacent conduits (e.g., pipe sections) when the flowmeter system 10 is coupled to the adjacent conduits via the flanges 14, 16. In the illustrated embodiment, the flange 14 and the downstream flange 16 are positioned at opposite ends (e.g., end portions) of the flowmeter body 12 to facilitate coupling of the flowmeter system 10 to the adjacent conduits. Thus, a fluid 32 (e.g., water, chemicals, gas, liquid, production fluid, drilling fluid) may enter at an upstream end 34 (e.g., end portion) of the flowmeter body 12, flow through the bore 30, and then exit through a downstream end 36 (e.g., end portion) of the flowmeter body 12. As used herein, the terms upstream and downstream are defined with respect to a flow path of the fluid 32. For example, in the illustrated embodiment, the upstream end 34 is upstream from the downstream end 36 because the fluid 32 flows from the upstream end 34 toward the downstream end 36. It should be understood that in certain embodiments the flow path of the fluid 32 may be in the opposite direction.

As shown, the connector 18 includes the flange 20, which enables the controller 22 to couple to the flowmeter body 12. The flange 20 couples to a conduit 38, which in turn couples to the flowmeter, body 12. The conduit 38 defines a bore 40 in communication with an aperture 42 in the flowmeter body 12. The sensor 24 may rest within the aperture 42 to enable the sensor 24 to detect rotation of the rotor 44. The rotor 44 rotates in response to the flow of the fluid 32 across the blades 46. The rotational speed of the rotor 44 depends on the speed of the fluid 32 flowing through the bore 30 of the flowmeter body 12. In other words, changes in the flow rate of the fluid 32 change the rotational speed of the rotor 44. In order to detect the rotation of the rotor 44, the sensor 24 may be a magnetic sensor that detects the presence of the blades 46. For example, the blades 46 may include paramagnetic materials. Accordingly, as the blades 46 rotate, the magnetic sensor 24 is able to detect and count each blade 46 as it rotates past the aperture 42. By counting the number blades 46 that rotate past the aperture 42, the controller 22 is able to determine the rotations per minute of the rotor 44. The rotational speed of the rotor 44 is then correlated to a flow rate of the fluid 32 through the flowmeter system 10.

The rotor 44 is supported by a shaft 48 that extends through a rotor body 50. The shaft 48 defines ends 52 and 54, which are supported by vanes 56 and 58 that rest within the bore 30 of the flowmeter body 12. More specifically, the ends 52 and 54 of the shaft 48 are supported in respective vane bodies 60 and 62. To facilitate rotation of the shaft 48, the vanes 56 and 58 may include bearings 64 and 66, which enable the shaft 48 to rotate relative to the vanes 56 and 58. The vanes 56 and 58 include one or more fins 68 that extend from the vane bodies 60 and 62. As illustrated, the fins 68 extend from the vane bodies 60, 62 and may contact an interior surface 70 of the flowmeter body 12. This may center the vane bodies 60, 62 and thus center the rotor 44 within the bore 30 of the flowmeter body 12.

As illustrated, various components and portions of the flowmeter system 10 may include additive structures 72 (e.g., open cell lattice structure, non-solid structure, or non-continuous structure). For example, in the flowmeter system 10 of FIG. 1, the flanges 14, 16, 20; rotor 44; and/or vanes 56 and 58 include the additive structure 72. The additive structures 72 may have any of a variety of forms including lattice, honeycomb, etc. The additive structures 72 are formed via an additive manufacturing process. Thus, some of or all of the components of the flowmeter system 10 may be formed as a one-piece structure (e.g., a gaplessly continuous one-piece structure) that is devoid of welded joints. To facilitate discussion, the flowmeter system 10 and the components therein may be described with reference to the axial axis or direction 74, a radial axis or direction 76, and/or a circumferential axis or direction 78.

Figure 3:
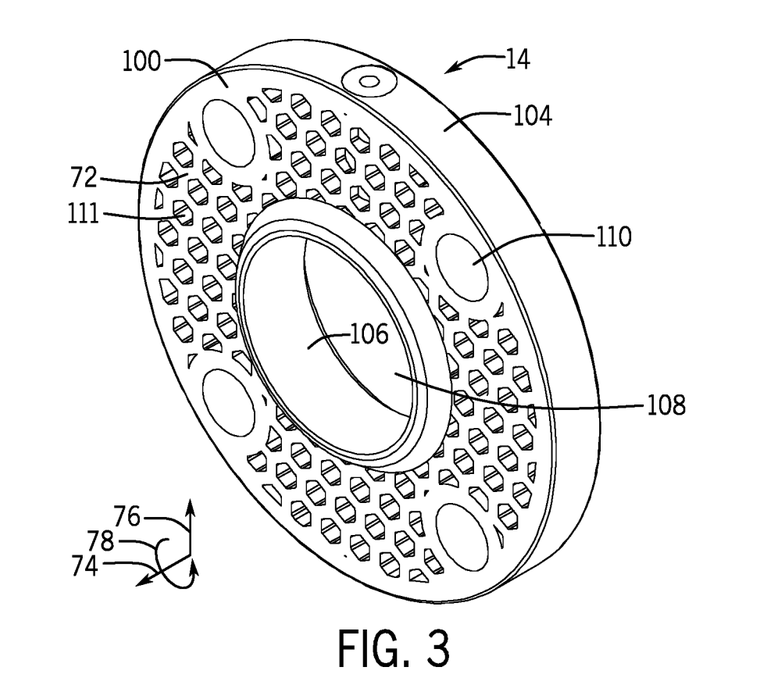
FIG. 3 is a perspective view of one side of a flange that may be used in the flowmeter system of FIG. 1, in accordance with an embodiment of the present disclosure.

FIG. 3 is a perspective view of one side of a flange (e.g., 14, 16, 20) that may be used in the flowmeter system 10 of FIG. 1. During the discussion below, the flange illustrated in FIG. 3 will be referred to as flange 14. However, it should be understood that the discussion below is equally applicable to the flanges 16 and 20 as well as other components of the flowmeter system 10. As shown, the flange 14 is a generally annular cylindrical structure that defines a first end 100 and a second end 102. The flange 14 has an outer wall 104 (e.g., solid wall, radially-outer annular wall, cylindrical wall) and an inner wall 106 (e.g., solid wall, radially-inner annular wall, cylindrical wall). The inner wall 106 defines an opening 108 (e.g., bore or aperture) in the flange 14. When the flange 14 is used as part of the flowmeter system 10, the opening 108 is aligned with and enables fluid to flow into the bore 30 of the flowmeter body 12.

In the illustrated embodiment, the flange 14 includes multiple openings 110 (e.g., through holes) that are configured to receive fasteners to couple the flange 14 to an adjacent flange. As shown, the flange 14 includes four openings 110 positioned about the circumference of the flange 14; however, any suitable number (e.g., 2, 3, 4, 5, 6, 7, 8, or more) openings 110 may be provided in the flange 14.

In the illustrated embodiment, the flange 14 includes the additive structure 72. As shown, the additive structure 72 may be in an interior portion of the flange 14. For example, the additive structure 72 may be provided between the outer wall 104 and the inner wall 106 of the flange 14. In the illustrated embodiment, at least some of the additive structure 72 is visible after the construction of the flange 14 is complete. However, in some embodiments, some or all of the additive structure 72 may not be visible after construction of the flange 14 is complete.

In the illustrated embodiment, the additive structure 72 define openings 111 that extend along the axial axis 74 (e.g., a central longitudinal axis of the openings 111 is parallel to the axial axis 74 of the flange 14). The openings 111 may be through holes that extend axially across the flange 14. For example, at least some of the openings 111 may extend between the first end 100 and the second end 102 and be open at the first end 100 and the second end 102. In the illustrated embodiment, at least some of the openings 111 have a hexagonal cross-sectional shape.

The configurations disclosed herein may reduce the weight of the flange 14 (e.g., by 10, 20, 30, 40, 50 percent or more), while maintaining adequate strength for use in pressure-containing components of a mineral-extraction system or a pipeline system, for example. For example, with reference to FIG. 4, the outer wall 104 may have a thickness 112 (e.g., a radial thickness that is solid and devoid of the additive structure 72) and the inner wall 106 may have a thickness 114 (e.g., a radial thickness that is solid and devoid of the additive structure 72). In some embodiments, the thicknesses 112, 114 may be between approximately 1 to 10, 2 to 9, 3 to 8, or 4 to 7 millimeters (mm). As shown, each opening 110 may be defined or surrounded by an opening wall 116 (e.g., annular wall) having a radial thickness 118 (e.g., a radial thickness that is solid and devoid of the additive structure 72), which may be between approximately 1 to 10, 2 to 9, 3 to 8, or 4 to 7 millimeters (mm). In some embodiments, some or all of the radial thicknesses 112, 114, 118 of the walls 104, 106, 116, respectively, may be equal to or greater than approximately 1, 2, 3, 4, 5, 6, 7, 8, 9, or 10 mm. Furthermore, a maximum diameter 120 of the flange 14 may be between approximately 100 to 200, 135 to 175, or 140 to 160 mm, and/or a diameter 122 of the bore 30 may be between approximately 30 to 100, 40 to 80, or 50 to 70 mm. With reference to FIG. 5, the openings 111 of the additive structure 72 have a hexagonal cross-sectional shape. As shown, adjacent openings 111 may be separated by a width 130 that is between approximately 1 to 10, 2 to 8, or 3 to 5 mm, and a width 132 of the opening 111 may be between approximately 1 to 10, 3 to 9, or 5 to 8 mm.

The dimensions provided above are intended to be exemplary, and it should be appreciated that the relative dimensions may scale with the overall size of the flange 14 and/or may vary based on the application. For example, the thickness 112 of the outer wall 104, the thickness 114 of the inner wall 106, and/or the thickness 118 of the opening wall 116 may be between approximately 1 to 25, 2 to 20, or 3 to 5 percent of the maximum diameter 120 of the flange 14. In some embodiments, the thickness 112 of the outer wall 104, the thickness 114 of the inner wall 106, and/or the thickness 118 of the opening wall 116 may be equal to or greater than approximately 1, 2, 3, 4, or 5 percent of the maximum diameter 120 of the flange 14. Additionally or alternatively, the width 130 between openings 111 of the additive structure 72 may be between approximately 1 to 25, 2 to 20, or 3 to 10 percent of the maximum diameter 120 of the flange 14. Additionally or alternatively, the width 132 of the openings 111 of the additive structure 72 may be between approximately 1 to 10, 2 to 8, or 3 to 5 percent of the maximum diameter 120 of the flange 14. Additionally or alternatively, the width 130 may be may be approximately 10 to 150, 30 to 100, 40 to 80, or 50 to 60 percent of the width 132, for example.

Figure 4:
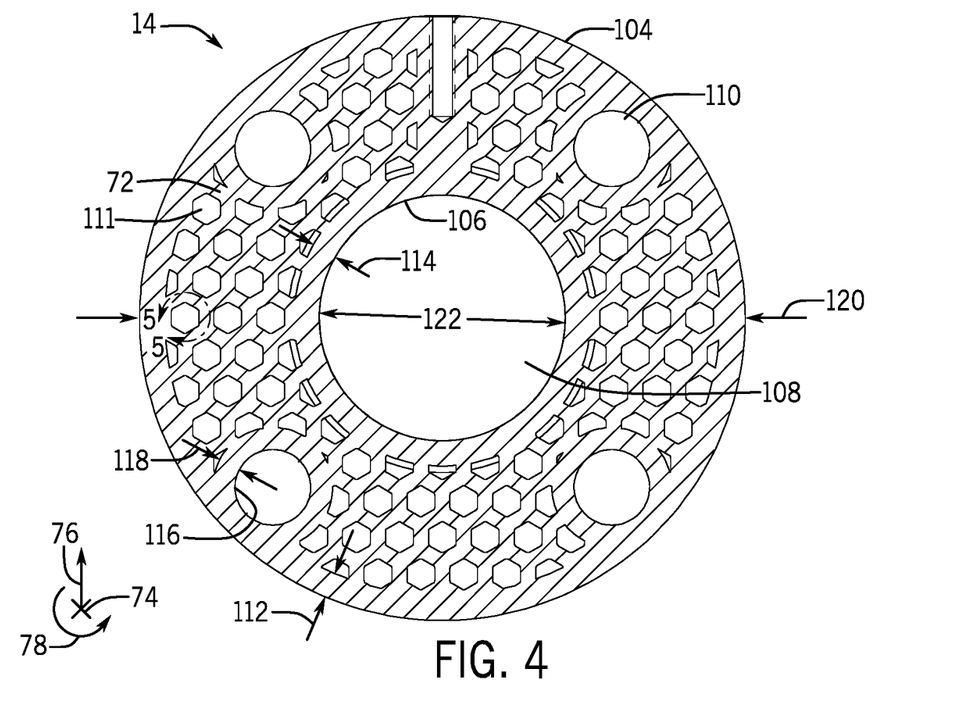
FIG. 4 is a cross-sectional view of the flange of FIG. 3, in accordance with an embodiment of the present disclosure.
Figure 5:
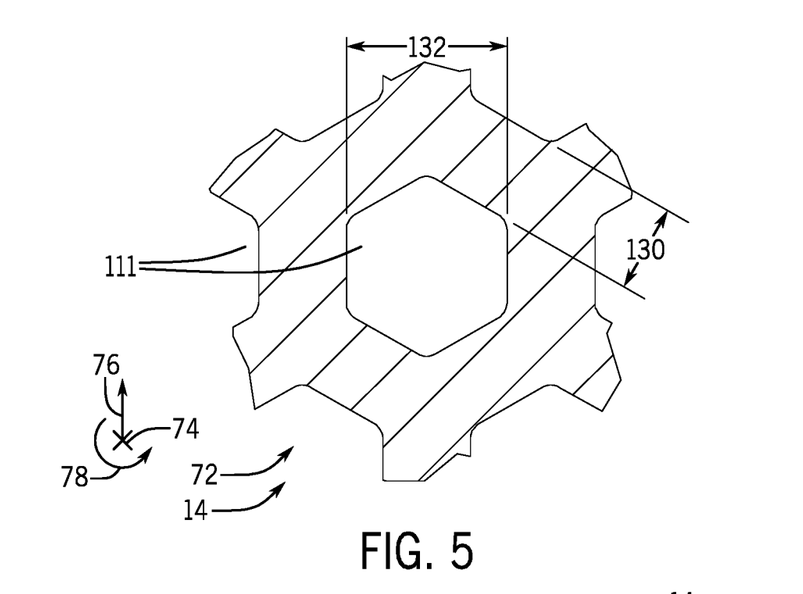
FIG. 5 is a cross-sectional view of an additive structure that may be used in the flowmeter system within line 5-5, in accordance with an embodiment of the present disclosure.

Furthermore, the geometry of the flange 14 and the additive structure 72 shown in FIGS. 3-5 is merely exemplary. It should be appreciated that the openings 111 may not be through holes and/or may have any of a variety of cross-sectional shapes, such as squares, triangles, rectangles (e.g., non-square), diamonds, pentagons, octagons, or circles. It should be appreciated that the openings 111 may be arranged to have various orientations relative to the axial axis 74 as well.

Figure 6:
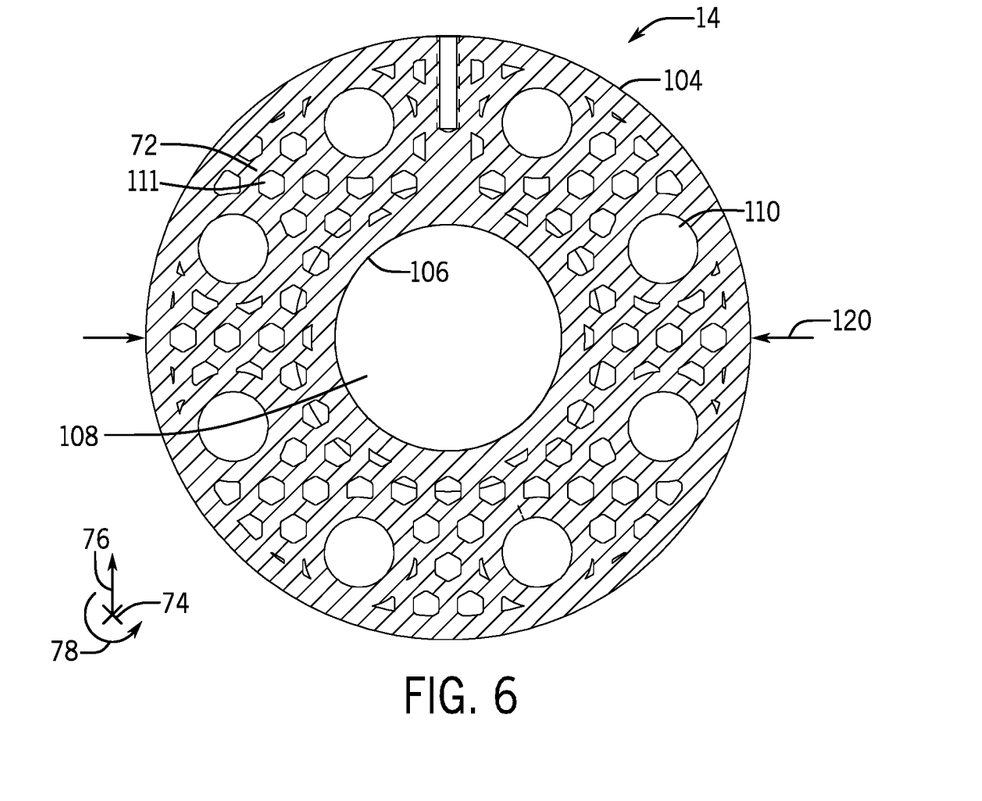
FIG. 6 is a cross-sectional end view of another flange that may be used in the flowmeter, in accordance with an embodiment of the present disclosure.

Moreover, it should be appreciated that the flange 14 may have various configurations. For example, FIG. 6 is a cross-sectional end view of another embodiment of the flange 14 that may be used in the flowmeter system 10. In FIG. 10, the additive structure 72 has different dimensions (e.g., widths 130, 132) or relative dimensions (e.g., ratio between widths 130, 132; ratio between widths 130, 132 and the maximum diameter 120). It should also be appreciated that the downstream flange 16 may have any of the features illustrated and described with respect to FIGS. 3-6. It should also be appreciated that the flanges (e.g., the flanges 14, 16) disclosed herein may be part of any of a variety of other components, such as valves (e.g., choke valves, ball valves, gate valves), pipe sections, or the like, that utilize flanges to couple to adjacent components.

Figure 7:
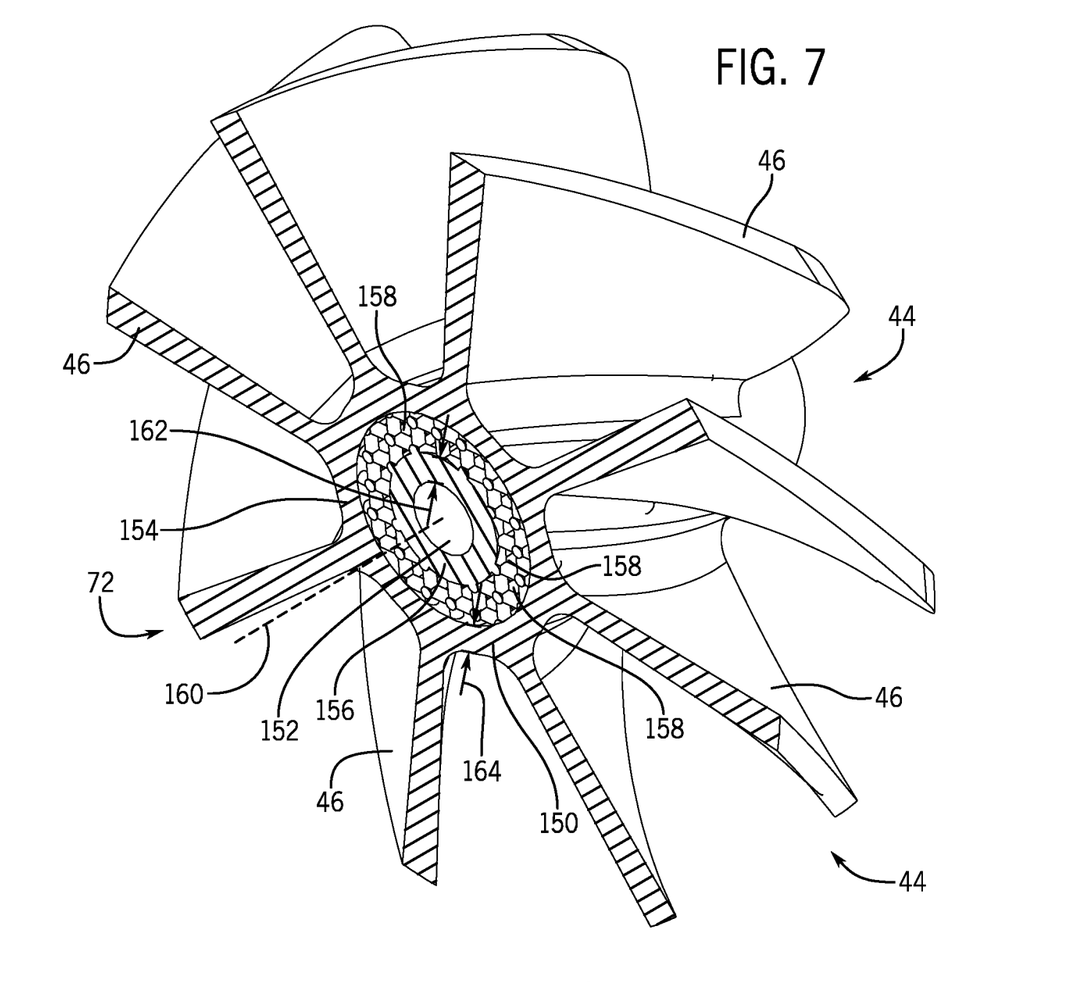
FIG. 7 is a perspective cross-sectional view of a rotor, in accordance with an embodiment of the present disclosure.

FIG. 7 is a perspective cross-sectional view of the rotor 44. As illustrated, the blades 46 couple to a rotor hub 150. The rotor hub 150 defines an aperture 152 that extends through the rotor 44 to enable the rotor 44 to receive the shaft 48. The rotor hub 150 has an outer wall 154 (e.g., solid wall, radially-outer annular wall, cylindrical wall) and an inner wall 156 (e.g., solid wall, radially-inner annular wall, cylindrical wall). The inner wall 156 defines the aperture 152 (e.g., bore or aperture) in the rotor hub 150. As illustrated, the rotor hub 150 includes the additive structure 72. For example, the additive structure 72 may be provided between the outer wall 154 and the inner wall 156 of the rotor hub 150. In the illustrated embodiment, the additive structure 72 defines a square and/or rectangular lattice structure. However, and as explained above, the additive structure 72 may have any variety of cross-sectional shapes, such as squares, triangles, rectangles (e.g., non-square), diamonds, pentagons, octagons, or circles. It should be appreciated that the openings 158 may be arranged to have various orientations relative to the longitudinal axis 160 of the rotor hub 150.

Figure 8:
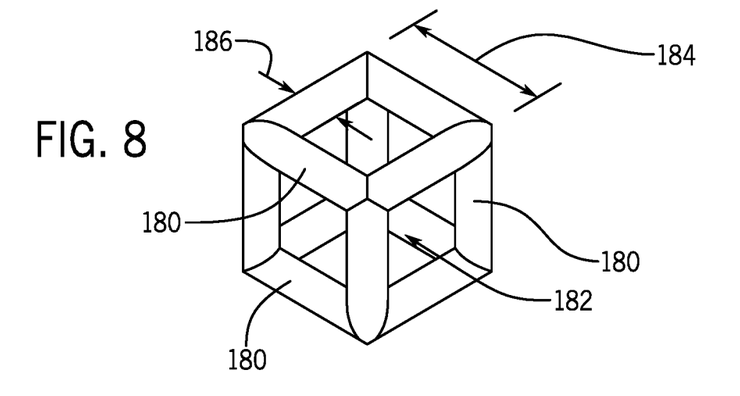
FIG. 8 is a cross-sectional view of an additive structure that may be used in the flowmeter system, in accordance with an embodiment of the present disclosure.

The additive structure 72 may reduce the weight of the rotor 44 (e.g., by 10, 20, 30, 40, 50 percent or more), while maintaining adequate strength. For example, the outer wall 154 may have a thickness 162 (e.g., a radial thickness that is solid and devoid of the additive structure 72) and the inner wall 156 may have a thickness 164 (e.g., a radial thickness that is solid and devoid of the additive structure 72). In some embodiments, the thicknesses 162, 164 may be between approximately 1 to 10, 2 to 9, 3 to 8, or 4 to 7 millimeters (mm). With reference to FIG. 8, the additive structure 72 may be square or rectangular and formed with a plurality of bars or rods 180 that define a cuboid space 182. The bars or rods 180 may have a length 184 that is between 1 to 10, 2 to 8, or 3 to 5 mm, and a width 186 that is between 1 to 6, 1 to 4, or 1 to 3 mm. The reduction in weight of the rotor 44 may enable a more rapid response to changes in flow rates through the flowmeter system 10. In other words, the rotor 44 may change its rotational speed or inertia more quickly because of the reduction in weight. A more rapid response to changing flow rates may enable more accurate measurements of fluid flow by reducing the lag that may occur between changes in the flow rate and the corresponding change in the rotational speed of the rotor 44.

Figure 9:
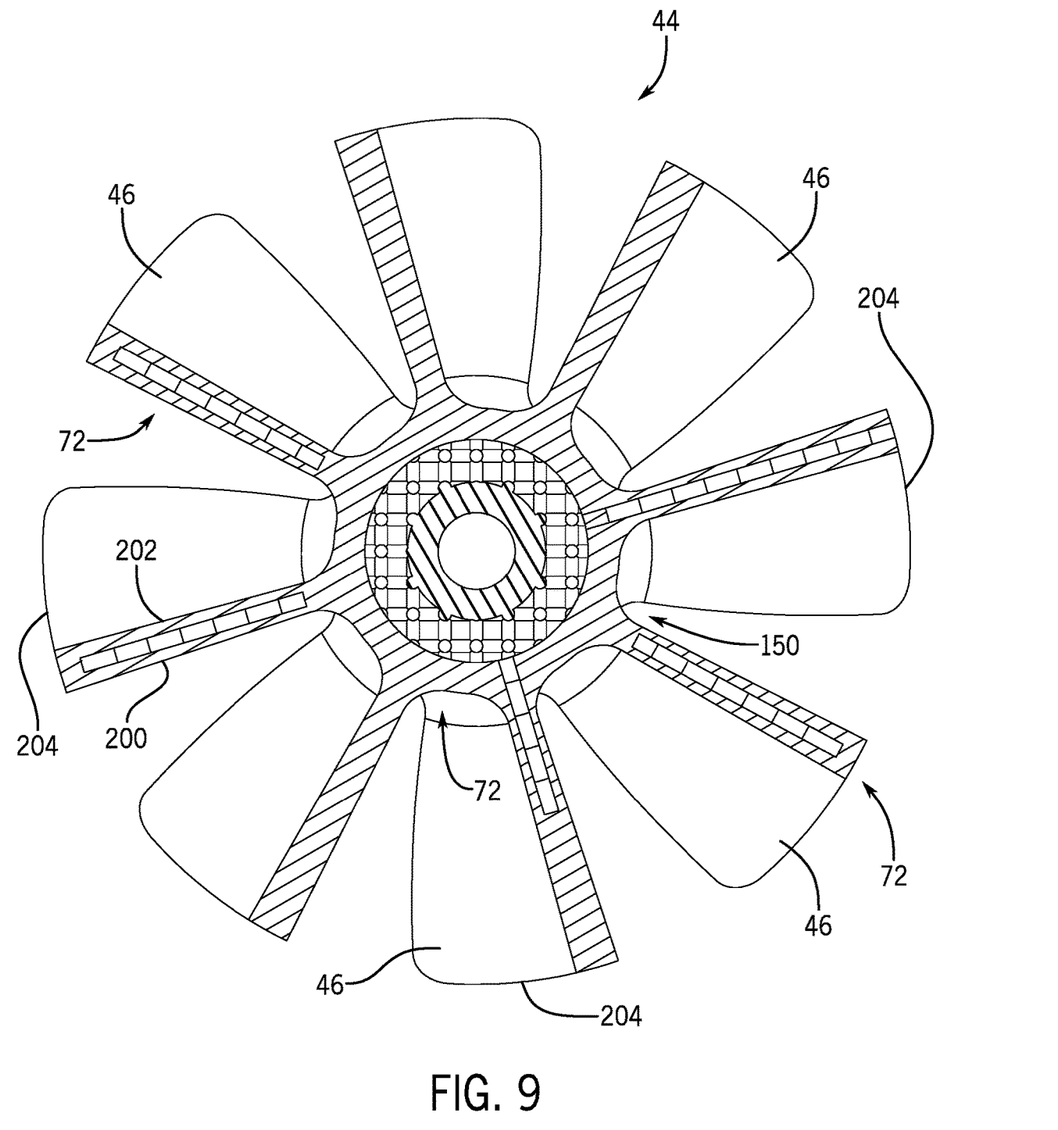
FIG. 9 is a cross-sectional view of a rotor, in accordance with an embodiment of the present disclosure.

FIG. 9 is a cross-sectional view of the rotor 44. As illustrated, the blades 46 may also include the additive structure 72. The additive structure 72 may be provided between opposing sidewalls 200 and 202 of the blades 46. In the illustrated embodiment, the additive structure 72 defines a square and/or rectangular lattice structure. However, and as explained above, the additive structure 72 may have any variety of cross-sectional shapes, such as squares, triangles, rectangles (e.g., non-square), diamonds, pentagons, octagons, or circles. In some embodiments, the additive structure 72 may be in all of the blades 46 or subset of the blades 46 (e.g., 1, 2, 3, 4, 5).

The additive structure 72 may reduce the weight of the blades 46 and therefore the overall weight of the rotor 44 (e.g., by 10, 20, 30, 40, 50 percent or more), while maintaining adequate strength. For example, the sidewalls 200 and 202 may have a thickness devoid of the additive structure 72. In some embodiments, the thicknesses of the sidewalls 200 and 202 may be between approximately 1 to 5, 1 to 4, 1 to 3 mm. The reduction in weight of the rotor 44 may enable a more rapid response to changes in flow rates through the flowmeter system 10. In other words, the rotor 44 may change its rotational speed or inertia more quickly because of the reduction in weight. A more rapid response to changes in flow rates may enable more accurate measurements of fluid flow.

As illustrated, the additive structure 72 may extend along the entire length of the blade 46 or partially along the length of the blade 46. For example, the additive structure 72 may extend from blade tips 204 to the outer wall 154 of the rotor hub 150. In some embodiments, the additive structure 72 in the blades 46 may couple to the additive structure 72 in the rotor hub 150. In still other embodiments, the additive structure 72 in the blades 46 may extend from the blade tips 204 to the additive structure 72 in the rotor hub 150.

Figure 10:
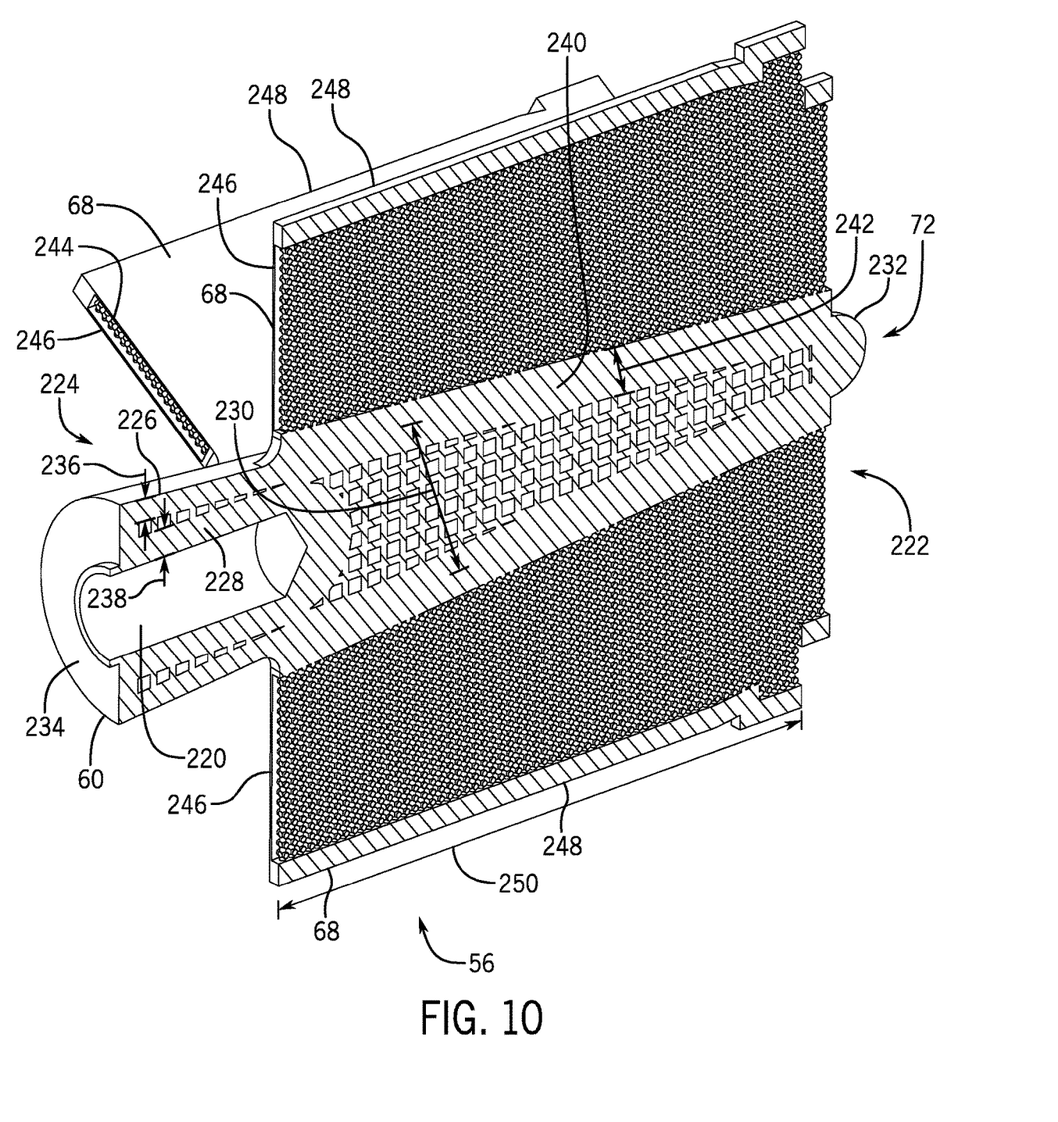
FIG. 10 is a perspective cross-sectional view of a vane, in accordance with an embodiment of the present disclosure.

FIG. 10 is a perspective view of one side of a vane (e.g., 56, 58) that may be used in the flowmeter system 10 of FIG. 1. During the discussion below, the vane illustrated in FIG. 10 will be referred to as vane 56. However, it should be understood that the discussion below is equally applicable to the vane 58 as well as other components of the flowmeter system 10. As illustrated, vane 56 includes the vane hub or body 60 and fins 68 that couple to the vane body 60. The vane body 60 defines an aperture 220 that receives an end 54 of the shaft 48. In some embodiments, the vane body 60 may define a first portion 222 that couples to the fins 68 and a second portion 224 that defines the aperture 220 and couples to the shaft 48.

In some embodiments, the second portion 224 may define an outer wall 226 (e.g., solid wall, radially-outer annular wall, cylindrical wall) and an inner wall 228 (e.g., solid wall, radially-inner annular wall, cylindrical wall). The inner wall 228 defines the aperture 220 (e.g., bore or aperture) in the second portion 224. As illustrated, the vane body 60 includes the additive structure 72. For example, the additive structure 72 may be provided between the outer wall 226 and the inner wall 228. In the illustrated embodiment, the additive structure 72 defines a square and/or rectangular lattice structure. However, and as explained above, the additive structure 72 may have any variety of cross-sectional shapes, such as squares, triangles, rectangles (e.g., non-square), diamonds, pentagons, octagons, or circles.

As illustrated, a width 230 (e.g., diameter) of the vane body 60 changes between opposing ends 232 and 234 of the vane 56. In some embodiments, the size of the additive structure 72 within the second portion 224 may progressive decrease in size the greater the distance from the end 234. By progressively decreasing in size, the additive structure 72 enables uniform or substantially uniform thicknesses 236 and 238 of the respective outer and inner walls 226 and 228. This uniformity may maintain adequate strength and rigidity of the vane body 60 to support the rotor 44 during operation of the flowmeter system 10.

The first portion 222 may also include additive structure 72 that reduces the weight of vane 56 while also maintaining adequate strength. In some embodiments, the vane 56 may include an outer wall 240 between the additive structure 72 and the fins 68. This outer wall 240 may also have a uniform or substantially uniform thickness 242 to maintain adequate strength and rigidity of the fins 68 with respect to the vane body 60 as the diameter of the vane body 60 changes between the first and second ends 232, 234.

The fins 68 may also include additive structure 72 between opposing sidewalls 244 and 246. In the illustrated embodiment, the additive structure 72 defines a square and/or rectangular lattice structure. However, and as explained above, the additive structure 72 may have any variety of cross-sectional shapes, such as squares, triangles, rectangles (e.g., non-square), diamonds, pentagons, or circles. In some embodiments, the additive structure 72 may be in all of the blades 46 or subset of the blades 46 (e.g., 1, 2, 3, 4, 5).

The additive structure 72 may reduce the weight of the fins 68 and therefore the overall weight of the rotor 44 (e.g., by 10, 20, 30, 40, 50 percent or more), while maintaining adequate strength. For example, the sidewalls 244 and 246 may have a thickness devoid of the additive structure 72. In some embodiments, the thicknesses of the sidewalls 244 and 246 may be between approximately 1 to 5, 1 to 4, 1 to 3 mm.

As illustrated, the additive structure 72 may extend along the entire width of the fin 68 or partially along the width of the fin 68. In some embodiments, the additive structure 72 in the fins 68 may couple to the additive structure 72 in the vane body 60. In still other embodiments, the additive structure 72 in the fins 68 may extend from the tips 248 to the additive structure 72 in the rotor hub 150. The additive structure 72 may also extend along an entire length 250 of the fins 68 or a portion of the length 250.

Figure 11:
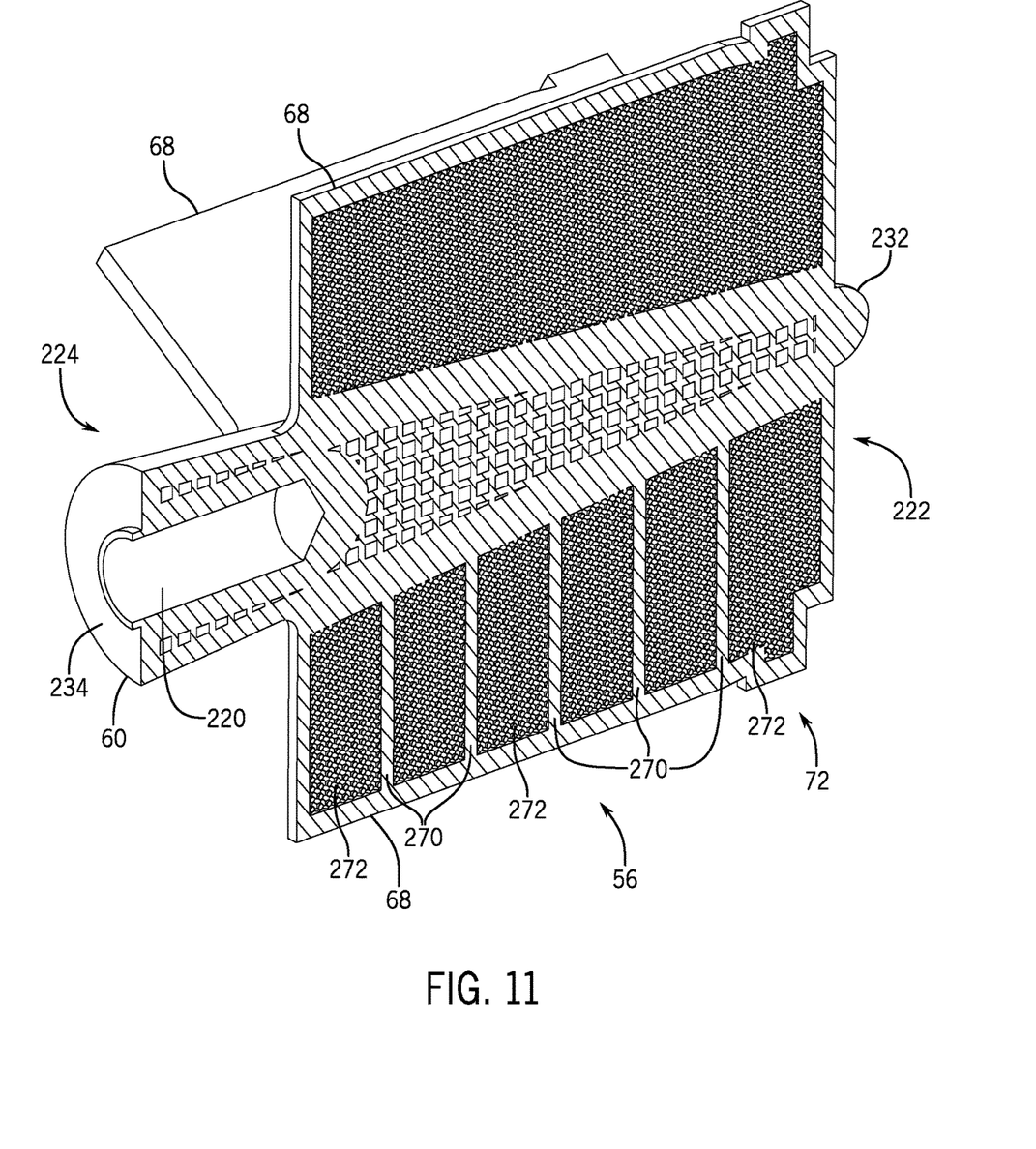
FIG. 11 is a perspective cross-sectional view of a vane, in accordance with an embodiment of the present disclosure.

FIG. 11 is a perspective cross-sectional view of the vane 56. As illustrated, walls may completely enclose the additive structure 72 in the fins 68. FIG. 11 also illustrates that one or more of the fins 68 may include one or more sections 270 of solid material between sections 272 of additive structure 72. These solid sections of material 270 may increase the overall strength and rigidity of the fins 68 while also enabling an overall reduction in the weight of the vane 56 and therefore the flowmeter system 10.

Figure 12:
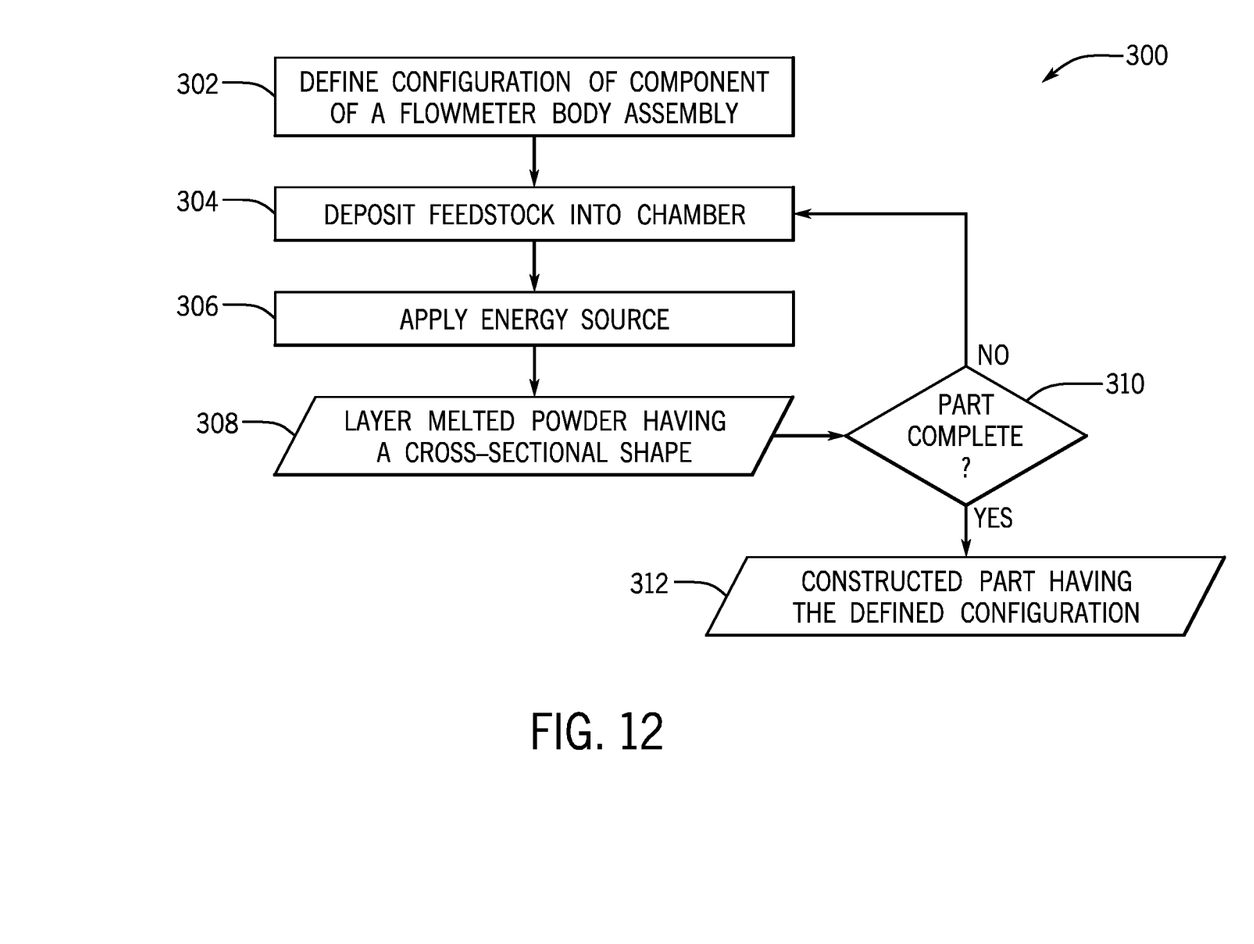
FIG. 12 is a method of manufacturing the flowmeter system of FIG. 1, in accordance with an embodiment of the present disclosure.

FIG. 12 is a flow diagram of a method 300 that may be used to manufacture the flowmeter system 10. The method 300 includes steps for constructing the flowmeter system 10 using an additive manufacturing process (e.g., 3-D printing, such as laser metal deposition). The method 300 may be performed by an additive manufacturing system, which may include a controller (e.g., electronic controller), a processor, a memory device, a user interface, and/or an energy source.

The method 300 includes defining a particular configuration or shape for the flowmeter system 10 (e.g., flowmeter body 12, flange 14, flange 16, connector 18, rotor 44, vane 56, vane 58), in step 302. The configuration may be a computer-generated three-dimensional representation of the flowmeter system 10 and may be programmed by an operator into an additive manufacturing system by using a specialized or general purpose computer having the processor, for example. The defined configuration may have any of the shapes and features described above.

In step 304, feedstock (e.g., a metal powder or wire) is deposited into a chamber, such as a vacuum chamber. Any of a variety of materials may used in any suitable combination, including those described in more detail below. In step 306, an energy source, such a laser or electron beam, is applied to the deposited feedstock to melt or otherwise consolidate the feedstock. As shown at block 208, a consolidated layer having a cross-sectional shape corresponding to the configuration defined in step 302 is formed. The processor or operator may determine whether the flowmeter system 10 is incomplete or complete, in step 310. If the part is incomplete, then steps 304 and 306 are repeated to produce layers of consolidated feedstock having cross-sectional shapes corresponding to the defined confirmation or model until construction of the flowmeter system 10 is complete. Thus, the energy source is applied to melt or otherwise consolidate each newly deposited portion of the feedstock until the final product is complete and the flowmeter system 10 having the defined configuration is produced, as shown in step 312.

The flowmeter system 10 constructed at step 312 via the method 300 may be devoid of welds or welded bonds. The flowmeter system 10 constructed at step 312 via the method 300 may be used in a mineral extraction system or a pipe system without further processing (e.g., without subsequent machining, smoothing, or heat and pressure treatments, such as hot isostatic pressing) of the flowmeter body assembly. However, in some embodiments, the flowmeter system 10 constructed at step 312 may be machined (e.g., to smooth or to shape various surfaces or to add threaded surfaces). Additionally or alternatively, in some embodiments, the flowmeter system 10 may be compacted via a heat and pressure treatment, such as a hot isostatic pressing process. In such cases, the flowmeter system 10 may be positioned within a canister. The flowmeter system 10 produced via the method 300 may have characteristics (e.g., density and/or porosity) that enable the flowmeter system 10 to maintain its shape during the hot isostatic pressing process. The canister may be sealed and vacuumed, and heat and/or pressure is applied to the flowmeter system 10 within the canister via a heat source and/or a pressure source (e.g., an autoclave furnace) to compact the flowmeter system 10 (e.g., further reduce porosity of the flowmeter system 10). In certain embodiments, the temperature applied to the flowmeter system 10 within the canister may be approximately 1050 to 1100 degrees Celsius, and the hydrostatic pressure within the canister may be approximately 400 to 450 MPa. However, any suitable temperature and/or pressure may be utilized to compact the flowmeter system 10.

Constructing components of the flowmeter system 10 via the method 300 may enable the components to be manufactured efficiently and/or on-site at the location where the components will be utilized. For example, the components may be manufactured via the method 300 via the additive manufacturing system on an offshore rig of a subsea mineral extraction system.

The flowmeter system 10 disclosed herein may have a reduced weight, while maintaining adequate structural integrity when used in mineral-extraction systems or pipe systems. For example, the flowmeter system 10 may demonstrate stress and plastic strain below allowable limits, thereby providing protection against failures, such as cracks and plastic collapse. The components the flowmeter system 10 may be formed from any of a variety of materials. For example, some or all of the portions of the flowmeter system 10 may be formed from a nickel-based alloy (e.g., Inconel 718) or a stainless steel material (e.g., martensitic precipitation hardened stainless steel, such as 17-4 PH). In some embodiments, some or all of the portions of the flowmeter system 10 may be devoid of any other materials (e.g., the portions only include a nickel-based alloy or a stainless steel material). It should be appreciated that different portions of the flowmeter system 10 may be formed from different materials (e.g., the additive structure 72 may be formed from a different material than the outer wall 104 and/or the inner wall 106 of the flanges 14, 16). In some embodiments, the flowmeter system 10 may be formed from a material having a yield strength of between approximately 700 and 1000 Newtons per square millimeter ($N/mm^2$) at room temperature.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims. It should be appreciated that any of the features illustrated in FIGS. 1-15 or disclosed herein may be combined in any combination.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A flowmeter system, comprising:
   a flowmeter body defining a central bore;
   a plurality of flanges coupled to the flowmeter body, wherein the flowmeter body and the plurality of flanges form a one-piece structure without welded joints;
   a rotor within the central bore of the flowmeter body;
   a first vane within the central bore of the flowmeter body, wherein the first vane couples to and supports the rotor within the flowmeter body; and
   wherein at least one of the flowmeter body, the flanges, the rotor, and the first vane comprise additive structures.

2. The flowmeter system of claim 1, wherein the additive structures comprise a lattice structure.

3. The flowmeter system of claim 1, wherein the additive structures comprise a honeycomb structure.

4. The flowmeter system of claim 1, wherein the rotor comprises additive structures that comprise a paramagnetic material.

5. The flowmeter system of claim 1, comprising a second vane configured to support the rotor.

6. The flowmeter system of claim 5, wherein the first vane and the second vane comprise a respective first vane body and a second vane body, and wherein the first vane body defines a first aperture and the second vane body defines a second aperture.

7. The flowmeter system of claim 6, comprising a shaft configured to extend through an aperture in the rotor, wherein a first end of the shaft is configured to rest within the first aperture and a second end of the shaft is configured to rest within the second aperture.

8. The flowmeter system of claim 6, wherein the first vane comprises a vane body and a vane fin coupled to the vane body wherein the vane body and the vane fin comprise the additive structures.

9. The flowmeter system of claim 1, wherein the plurality of flanges comprises a first flange, a second flange, and a third flange, and wherein the first flange and the second flange couple to ends of the flowmeter body and the third flange is between the first flange and the second flange.

10. The flowmeter system of claim 9, wherein the third flange surrounds an aperture that extends through the flowmeter body.

11. A method of manufacturing a flowmeter system, the method comprising:
    defining a configuration for a flowmeter body, a rotor, a vane, and/or a flange, wherein at least one of the flowmeter body, the rotor, the vane, and/or the flange comprises an additive structure;
    depositing a feedstock into a chamber;
    applying an energy source to the feedstock; and
    consolidating the feedstock into a layer according to the defined configuration.

12. The method of claim 11, wherein the feedstock comprises a paramagnetic material.

13. The method of claim 11, wherein the additive structure is a lattice structure.

14. The method of claim 11, wherein the additive structure is a honeycomb structure.

15. The method of claim 11, wherein the vane comprises a vane body and a vane fin coupled to the vane body wherein the vane body and the vane fin comprise the additive structure.

16. A flowmeter system, comprising:
    a flowmeter body defining a central bore;
    a plurality of flanges coupled to the flowmeter body, wherein the flowmeter body and the plurality of flanges form a one-piece structure without welded joints;
    a rotor within the central bore of the flowmeter body;
    a first vane within the central bore of the flowmeter body, wherein the vane couples to and supports the rotor within the flowmeter body; and
    wherein the flowmeter body, the flanges, the rotor, and the first vane comprise additive structures.

17. The flowmeter system of claim 16, wherein additive structure changes within at least one of the flowmeter body, the flanges, the rotor, and the first vane.

18. The flowmeter system of claim 17, wherein a pattern of the additive structures change.

19. The flowmeter system of claim 17, wherein dimensions of the additive structures change.

20. The flowmeter system of claim 16, wherein the rotor comprises additive structures that comprise a paramagnetic material.

* * * * *